United States Patent
Wang et al.

(10) Patent No.: US 9,009,281 B2
(45) Date of Patent: Apr. 14, 2015

(54) COMPOSITION OF SERVICES

(75) Inventors: Yin Wang, Sunnyvale, CA (US); Hamid Reza Motahari Nezhad, Los Altos, CA (US); Ram Swaminathan, Cupertino, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 13/175,211

(22) Filed: Jul. 1, 2011

(65) Prior Publication Data
US 2013/0007242 A1 Jan. 3, 2013

(51) Int. Cl.
*G06F 15/16* (2006.01)
*H04L 29/00* (2006.01)
*G06F 9/445* (2006.01)
*G06Q 20/00* (2012.01)
*G06F 9/44* (2006.01)

(52) U.S. Cl.
CPC *H04L 29/00* (2013.01); *G06F 8/60* (2013.01); *G06Q 20/00* (2013.01); *G06F 8/20* (2013.01)

(58) Field of Classification Search
None
See application file for complete search history.

(56) References Cited

U.S. PATENT DOCUMENTS

| | | | |
|---|---|---|---|
| 7,035,944 B2 | 4/2006 | Fletcher et al. | |
| 7,644,377 B1 | 1/2010 | Saxe et al. | |
| 7,693,972 B2 * | 4/2010 | Heller et al. | 709/223 |
| 7,823,154 B2 | 10/2010 | Wang et al. | |
| 7,937,500 B2 | 5/2011 | Fletcher et al. | |
| 2004/0136027 A1* | 7/2004 | Zehler | 358/1.15 |
| 2007/0147355 A1* | 6/2007 | Da Palma et al. | 370/356 |
| 2010/0132014 A1* | 5/2010 | Montagut et al. | 726/1 |
| 2010/0185961 A1 | 7/2010 | Fisher et al. | |
| 2010/0235355 A1 | 9/2010 | Carter et al. | |

FOREIGN PATENT DOCUMENTS

| | | | |
|---|---|---|---|
| EP | 1865424 A1 | | 12/2007 |
| GB | WO 2008/015417 | * | 2/2008 |
| WO | 2005/083983 A2 | | 9/2005 |

\* cited by examiner

*Primary Examiner* — Djenane Bayard
(74) *Attorney, Agent, or Firm* — International IP Law Group, PLLC (57) ABSTRACT

A method of generating a set of composite services is provided herein. The method includes receiving standardized service descriptions of a set of component services from service providers. The standardized description of a component service may be translated to an automaton-based description. A specified goal associated with the set of component services may be received. The set of composite services may be generated based on the automaton-based description and the specified goal. Each of the generated composite services may accomplish the specified goal.

20 Claims, 5 Drawing Sheets

COMPOSITION OF SERVICES

BACKGROUND

A service is a software application that is made available over a communication network, such as a cloud computing network. Any organization may avoid the expense of developing customized software by using services. In this way, ready-to-run software may be provided for various entities, such as organizations conducting business on the Internet. An example of a service may be software that enables a company to take credit payments over the Internet. Further, services can be aggregated to form a composite service. The services that comprise a composite service are called component services. Typical service composition methods use service models that describe the semantics of the component services. Based on service models, service composition can be automated.

BRIEF DESCRIPTION OF THE DRAWINGS

Certain embodiments are described in the following detailed description and in reference to the drawings, in which.

DETAILED DESCRIPTION

Services are accompanied by service description models. If a service is composite, it has a service composition model. Service description models describe available services. Service composition models describe component services that are composed to create composite services. These models also describe how their composition works. Typically, service composition approaches make assumptions on how models describe the component services, and then design composition algorithms that support a specific service description model. With various standards for service models available, it may be challenging for service vendors and consumers to compose services that are described using the various available models.

Service description and composition models use various description languages and technical frameworks. Frameworks for service composition usually fall into two categories: automatic or manual composition. Manual composition frameworks may use languages such as the Web Services Business Process Execution Language WS-BPEL (Business Process Execution Language), which is an industrial standard for describing service composition models.

In one embodiment, a service composition approach supports the various types of service description models. Using a holistic framework, services described using various description language types may be composed from a repository where the models are described using a universal description language. The framework may automatically translate services described in existing service models into a universal service description model. The universal model may be data-driven. Being data driven may make the universal model simple and more suitable for composition than typical models. Additionally, a method may be used to compose component services in the universal model into a composite.

Figure 1:
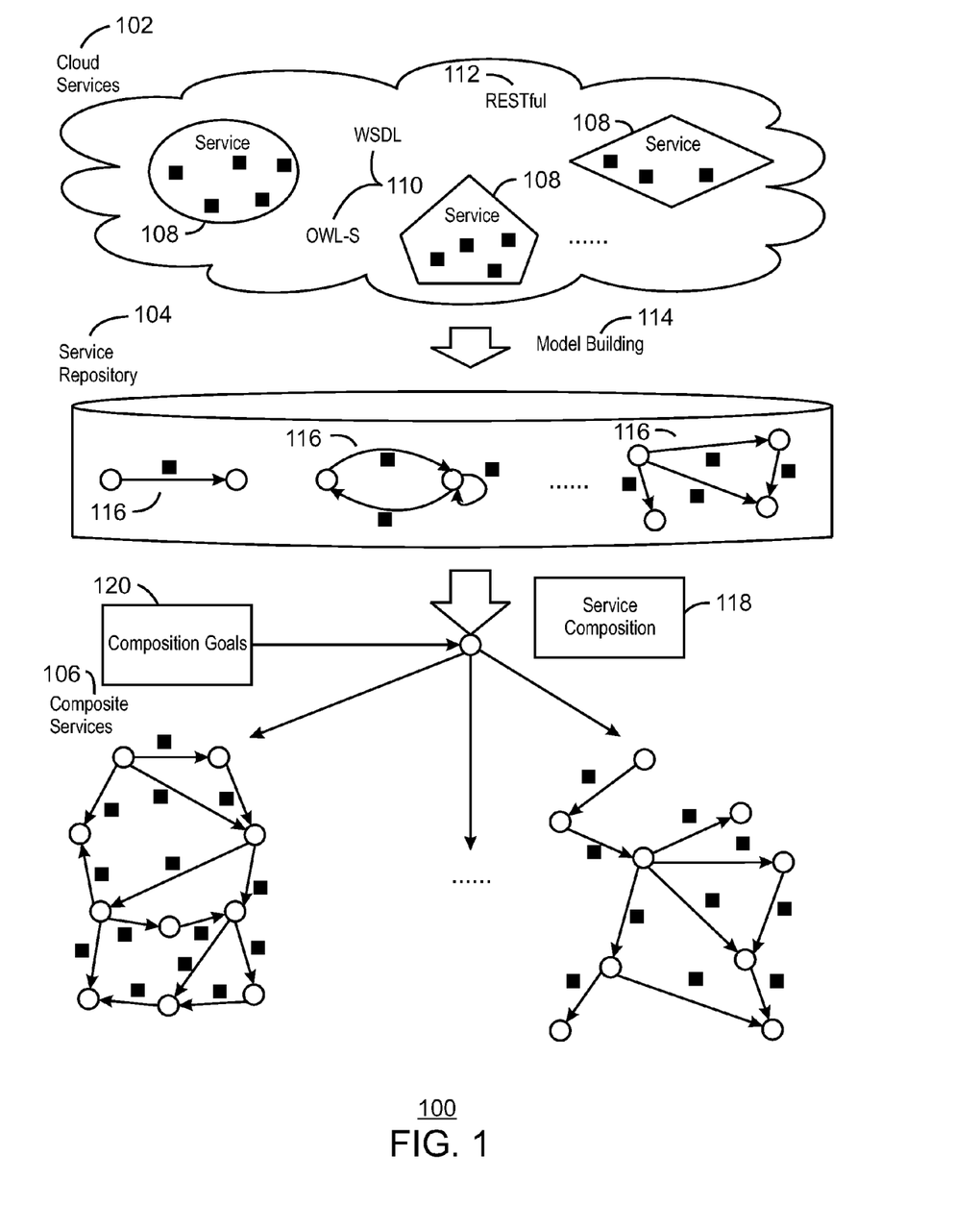
FIG. 1 is a block diagram of a framework in accordance with an embodiment.

FIG. 1 is a block diagram of a framework 100 in accordance with an embodiment. The framework 100 includes services 102, a service repository 104, and composite services 106. Services 102 include standardized services 108 described using languages 110, such as WSDL (Web Service Description Language) and OWL-S, RESTful style services 112, and complicated non-standard services offered by cloud service companies. WSDL is an XML format that describes network services. OWL-S is a semantic markup language for web services. Representational State Transfer (REST) is a style of software architecture that can be used to distribute services over the network. The RESTful style services are typically provided as web applications on HTTP.

Services 102 may provide functionality such as area code lookup, currency converter, shipping fee calculator, etc. Services 102 may be described in terms of states and operations. The state may describe a condition of a service component, and an operation may be a function invoked via an API call. Operations are also referred to herein as transitions, because operations typically modify a state of a service component. For example, a service 108 may be used to make a purchase with a credit card. Before the purchase, the credit card may be in a "chargeable" state, meaning the credit card references an account with enough credit to cover the purchase cost. An operation to charge the cost to the credit card may change the state to "charged," meaning funds from the account may be transferred to the retailer. Typically, each service 108 consists of a set of APIs or operations, denoted as solid squares.

Model building 114 may be a process that translates the models of the cloud services 102 into models that are described universally. These universal models 116 may be provided via the service repository 104. The universal models 116 may be represented as automata. As used herein, automata are finite state machines consisting of states and transitions.

The universal models 116 of the repository 104 may be used to generate composite services 106. A service composition process 118 may use a composition goal 120 to find a set of relevant component services in the universal models 116. The composition goal 120 may describe a desired state of the service 108. The service composition process may further compose these relevant component services into a composite service 106. The composite service 106 may also be represented as an automaton. In one embodiment, the service composition process 118 may use a parallel product operation based on the composition goal 120.

Figure 2:
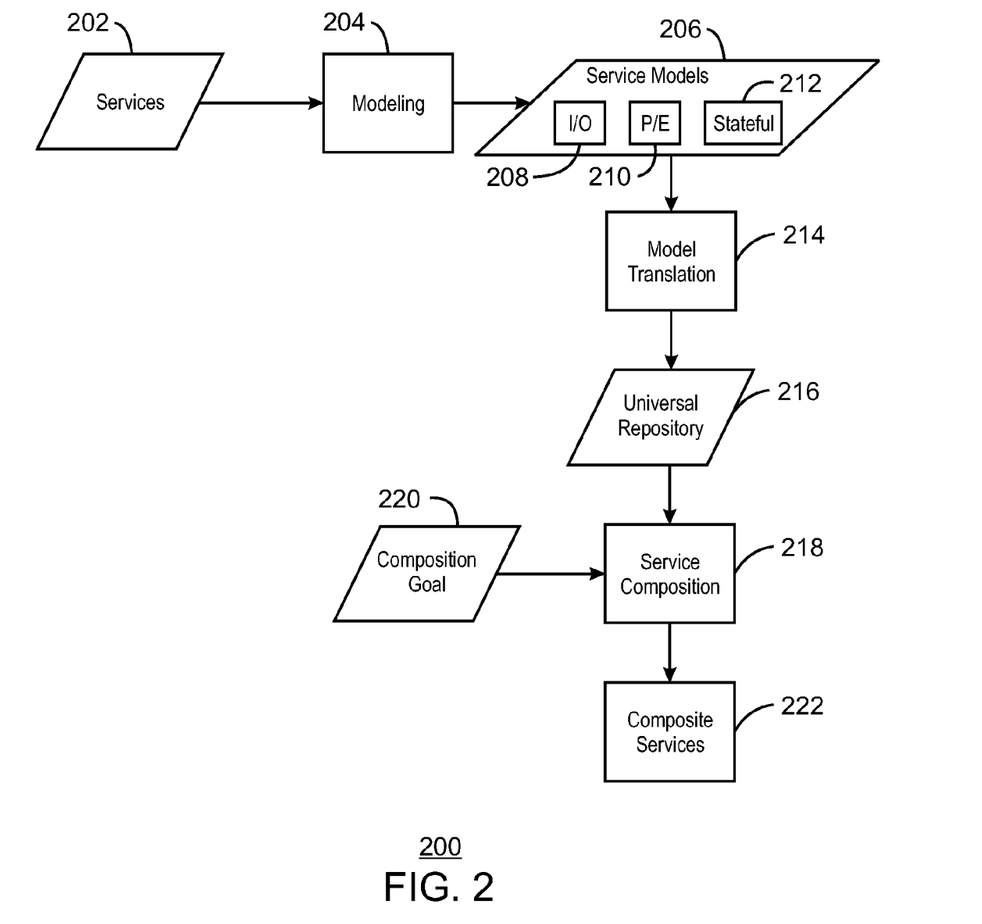
FIG. 2 is a data flow diagram of a method for generating composite services in accordance with an embodiment.

FIG. 2 is a data flow diagram of a method 200 for generating composite services in accordance with an embodiment. It should be understood that the data flow diagram is not intended to indicate a particular order of execution. One or more service 202 may be modeled with a modeling process 204. In one embodiment, the modeling process 204 may generate one or more service models 206 for service 202. There are various types of service models 206, including input-output (I/O) models 208, precondition-effect (P/E) models 210, and stateful models 212. In I/O models 208, an operation may be modeled as a pair of input and output sets, which are identified by a data schema. The Web Services Description Language (WSDL) defines the data schema of an operation, and can be used as the I/O model 208. In P/E models 210, an operation may be modeled as a pair of pre-condition and effect sets. The precondition and effect sets are logic literals typically representing the state of the component service. One embodiment allows for the definition of positive and negative effects in P/E models 210. In stateful models 212, a component service may use finite automata to describe the various states of the service 202, and the dependencies among the stateful model's operations.

In one embodiment, a model translation process 214 may translate the various types of service models 206 to generate a universal repository 216. The universal repository 216 may include universally described models, based on finite state automata. In the universal models, there are states and transitions between them. The states signify the different states of the service 202. The transitions may be atomic operations from the service 202 that take the service 202 from one state to another.

The model translation process 214 may provide an automated approach to translate service descriptions in standard languages such as WSDL and OWL-S into universal models based on automata. The transitions in the universal models may represent operations of services 202. States may have different meanings depending on the service descriptions. In the case of translated I/O models, an automaton state in the translated universal model may represent the availability of input or output data. In the case of translated P/E models, the automaton state may represent the value of state literals or variables used in preconditions and effects. For translated stateful models, automaton-based descriptions may be used directly. Typically, stateful models 212 include representations that are equivalent to automaton of the universal model. For example, a reachability graph represents all reachable states of a Petri net and the transition relationships among these states. A Petri net is a bipartite graph that is frequently used to model concurrent systems. The reachability graph for a bounded Petri net is an automaton that represents its dynamics.

For translating the I/O models 208, one principle in building the automata may involve making available all the data in the input set of a given operation, o. After making all the data in the input set available, the execution of operation, o, may be allowed. Accordingly, for each piece of data, d, in the input set, a transition may be built with two states (an entry and end state) in the universal model. The entry state may represent the case where the data, d, is not available. When d is not available, an operation may be executed that generates d as one of its output. Accordingly, the automaton may be moved to the end state where d is available. Only at the end state, may operations be executed that take d as input. An automaton constructed accordingly may ensure that an operation that generates d precedes any operation that uses d as input.

For translating the P/E models 210, an automaton may be constructed for each literal in the P/E model 210. The literal represents the state of the service or the state of the external world, for example, "light on" can be the literal for the service of light switch, it represents the status of the light. For each literal, l, two states may be added that represent the true or false values that the literal, l, may have. Operations that have literal, l, in their positive or negative effect set may move the automaton to the corresponding states. Operations that use the literal, l, as a precondition, and do not negate it after execution, may only be executed when the literal, l, is true. In practice, enumeration variables, which also describe the state of the service or the external world, but takes values more than "true" and "false", are often used in preconditions and effects. For example, if the state of an order is "chargeable", a "charge" operation may be executed, the effect of which is to change the state to "charged." If the state is "charged", a "shipping notification" operation may be executed. While it is possible to encode these conditions into multiple propositional literals, it may be more efficient to use one automaton for the enumeration variable. Propositional literals can take only binary values (true or false), which are essentially a special case of enumeration variables. More specifically, each state (possibly more than two) in the automaton may represent a possible value of the enumeration variable, and operations may represent API calls that change the enumeration variable value.

For translating stateful models 212, services already modeled by automata may be incorporated into directly into the universal repository 216. For other stateful models 212, off-the-shelf algorithms and tools may be used for translation into universal models based on automata. For example, the reachability graph of a bounded Petri net is an automaton. Further, workflows may be modeled by Petri nets, and subsequently converted into automata. As such, existing workflows may be used as services for the composition process 218. It is noted that because models based on automata do not capture parallelism, the internal concurrency of a service 202 may be lost after the translation.

A service composition process 218 may use a composition goal 220 to find and compose a set of relevant component services from the universal repository 216 into a composite service 222. The composite service 222 may include multiple paths to reach a goal state. A user may select from among the alternatives in the composite service 222. After translation, the universal repository 216 may contain uniform automaton models. Transitions in these automata may represent operations or API calls of different services 202. As such, a parallel product operation may be used for service composition. The parallel product operation (also referred to herein as synchronous product) may synchronize different automata based upon shared transitions. Non-shared (local, private) transitions may only follow the dynamics of its own model. Depending on the given composition goal 220, the service composition process 218 may only integrate relevant automata from the repository 216 through the parallel product operation. The composite service 222 generated by the parallel product operation may include automata that fulfills the composition goal 220. After the service composition process 218, there may be an execution phase that operates on the composite service 222, and controls its execution to reach certain objectives.

Since each component automaton in the universal repository 216 may represent the life cycle of a data attribute, the composition goal 220 may be specified as pairs of initial and goal states for a specified subset of component automata. The composite service 222 may involve more component automata than specified in the composition goal 220 because the parallel product operation synchronizes automata on shared events. Therefore, automata that share events with those in the task specification may be included in the composite service 222. Algorithm 1 may represent one embodiment of the service composition process 218:

---

ALGORITHM 1

INPUT: Universal repository 206 and a composition task specified as pairs of initial and goal states on a subset of automata $G' \subset G$
OUTPUT: Parallel product automaton
Initialize stack $T = G'$, and result set $S = G'$
while $T \neq \emptyset$ do
   $g = T.pop()$
   for every $h \in G$ that shares events with g do
      if $h \notin S$ then
         add h to S
         T.push(h)

ALGORITHM 1
-continued

```
        end if
    end for
end while
build parallel product for automata in S
```

Algorithm 1 takes the composition goal 220 as the input, selects relevant automaton models from universal repository 216, and uses parallel product to build the composite service that achieves the goal 220. Since each component automaton in the repository 216 represents the life cycle of some data attribute, the composition task may be specified as pairs of initial and goal states for a subset of component automata. The final composition could involve more component automata since parallel product synchronizes automata on shared events. Therefore, automata that share events with those in the task specification may be included in the composite services 222.

The computational complexity of the service composition algorithm that is based on the parallel product operation may depend on the size of the composite service 222. The parallel product operation constructs the Cartesian product for the state sets of all automata involved in an operation, which dominates the computation. The composite services 222 are represented as automatons. The automatons may have multiple alternative paths to reach the composition goal 220 from a start state. In one embodiment, an extraction operator may be used to extract a subset of alternative paths to the composition goal 220. Each of these extracted automata is a composite service 222. Extraction may result in a smaller composite service 222. Additionally, composite services 222 may be selected based on non-functional criteria, such as cost, response time, etc. Depending on the extraction operator, the composite services 222 may include exactly one composite service 222, or a set.

Extraction may provide an advantage because not every transition in the automaton may be controllable. For example, in credit card services 202, a credit card charge may be denied. As such, the customer may cancel the order. Accordingly, it is not always possible to follow a predetermined path, such as fulfilling an order and shipping it. Multiple paths may improve the flexibility for an execution engine. An execution engine is a software program that controls the execution of composite services.

In some cases, the service 202 may be described by reference documents instead of standard I/O, P/E or stateful models. However, the semantics of such APIs may be captured by an automaton model. Further, the translation from reference documents to automata may be automated if a standardized syntax and structure are added to the reference documents. Otherwise, some services may take four weeks or more to be composed manually.

One example financial service helps merchants manage payments from customers. The service makes calls to checkout APIs using XML messages sent using HTTP POST. Many of the checkout APIs provide simple stateless calculation. Such APIs may be captured by I/O service models using the APIs' inputs and outputs. In this way, an I/O model 208 may be constructed. The I/O model 208 may be automatically translated into automata, as described above. For example, shipping cost and tax calculations are stateless APIs. In these APIs, the shopping cart is the input, the cost is the output. Other, more complex APIs, may involve order processing and financial commands. Such APIs may have their own, respective status variables, such as an order fulfillment status and a financial status. Order processing and financial command APIs may change the values of the two variables, respectively. Table 1 shows a list of example financial states for a customer's order:

TABLE 1

| Financial Status State | Permitted Operations | Description |
| --- | --- | --- |
| REVIEWING | None | REVIEWING is the default financial state for all new orders . . . The service provider updates the financial status to CHARGEABLE. |
| CHARGEABLE | authorize-order cancel-order charge-and-ship-order | The CHARGEABLE state indicates that the customer may be charged for an order with the charge-and-ship-order operation. The order may be cancelled with the cancel-order operation. |
| CHARGING | None | The service provider updates the financial status to CHARGED |
| CHARGED | authorize-order charge-and-ship-order refund-order | The CHARGED state indicates the customer has been fully or partially charged for an order. For the partially charged customer, the order remains chargeable until the customer is charged for the full amount. |
| PAYMENT_DECLINED | cancel-order | This state indicates that the service provider's effort to authorize or charge the customer's credit card failed. |

TABLE 1-continued

| Financial Status State | Permitted Operations | Description |
| --- | --- | --- |
| CANCELLED | None | The CANCELLED state indicates that either the buyer or the merchant canceled the order. |
| CANCELLED_BY_PROVIDER | None | No further status update to this state. |

In some of these states, no operations are permitted to be performed. As shown in the description of the REVIEWING, CHARGING, CANCELLED, and CANCELLED BY PROVIDER states, only the service provider updates the financial order status for orders in these states. For some of these states, a list of valid operations may be performed.

Figure 3:
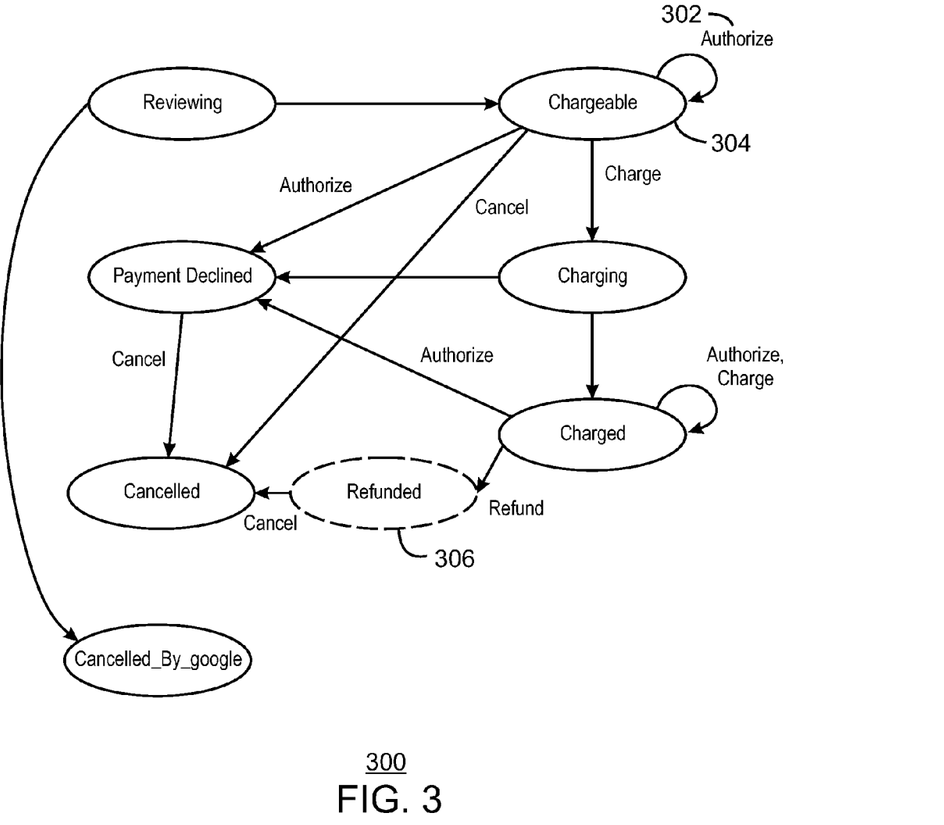
FIG. 3 is a diagram of an automaton in accordance with an embodiment.

FIG. 3 is a diagram of an automaton 300 translated from Table 1, in accordance with an embodiment. The states are represented as ovals. Transitions between the states are represented as arrows. For states that are updateable by the service provider alone, the transitions are unlabeled. For states with valid operations, the arrows are labeled with the name of the operation. The arrows point to the updated state. In some cases, an operation may not update the state, as shown for the authorize operation 302 on the "chargeable" state 304. The automaton 300 includes a "refunded" state 306. The oval for the refunded state 306 is dashed because, while not listed in the reference document, the refunded state 306 may be inferred. Such cases may represent an issue with document consistency, which an embodiment may advantageously resolve through automated translation.

An embodiment may also provide other advantages, such as a comprehensive service composition framework where service vendors can use various service models to describe their services. These models may be translated into a universal service model based on finite state automaton, which is a more valuable representation than that provided by other service model types. The embodiment uses a data-driven approach instead of an operation-centric approach, which provides the advantage of clarifying where data is produced and consumed, rather than what services are called and consumed in the composition. Further, services from different models may be composed together.

Figure 4:
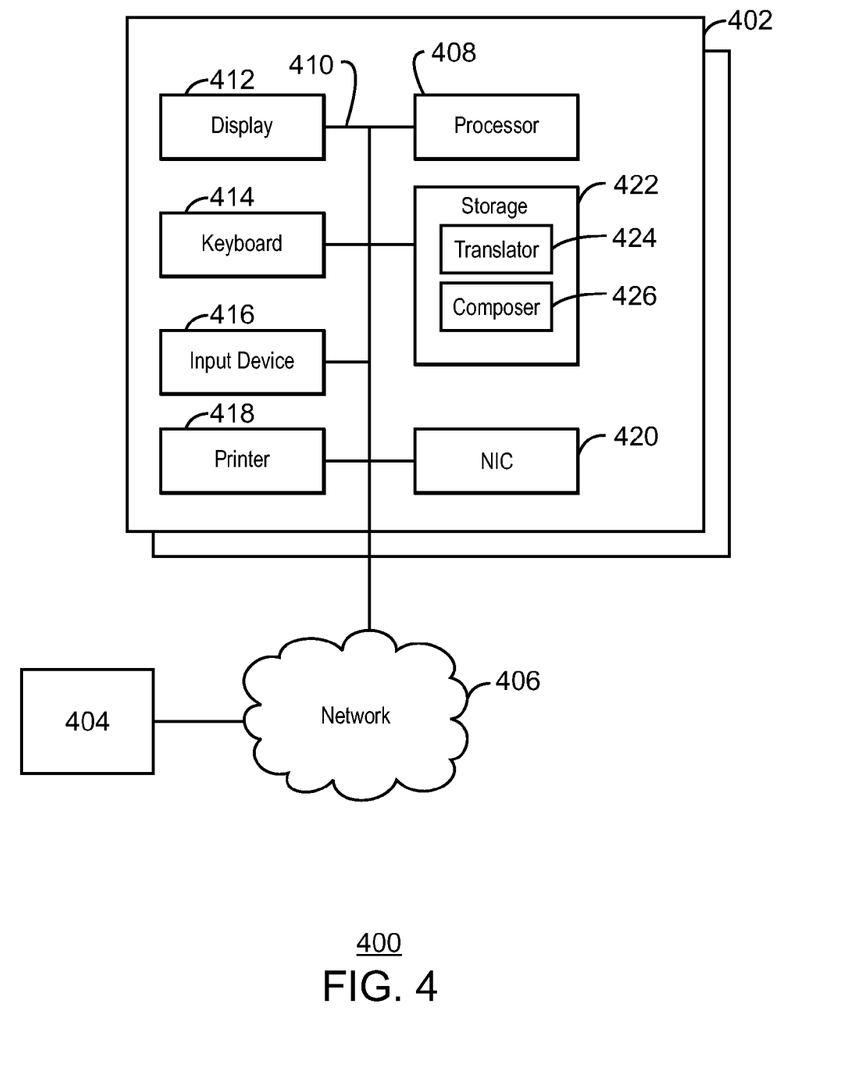
FIG. 4 is a block diagram of a system for generating a set of composite services in accordance with an embodiment.

FIG. 4 is a block diagram of a system 400 for generating composite services in accordance with an embodiment. The functional blocks and devices shown in FIG. 4 may comprise hardware elements, software elements, or some combination of software and hardware. The hardware elements may include circuitry. The software elements may include computer code stored on a non-transitory, computer-readable medium. Additionally, the functional blocks and devices of the system 400 are but one example of functional blocks and devices that may be implemented in an embodiment. Specific functional blocks may be defined based on design considerations for a particular electronic device.

The system 400 may include servers 402 for consumers of services. The servers 402 may be in communication with service providers 404 over a network 406. The servers 402 may include a processor 408, which may be connected through a bus 410 to a display 412, a keyboard 414, an input device 416, and an output device, such as a printer 418. The input devices 416 may include devices such as a mouse or touch screen. The servers 402 may also be connected through the bus 410 to a network interface card 420. The network interface card 420 may connect the servers 402 to the network 406. The network 406 may be a local area network, a wide area network, such as the Internet, or another network configuration. The network 406 may include routers, switches, modems, or any other kind of interface device used for interconnection. In one example embodiment, the network 406 may be the Internet.

The servers 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory.

The storage 422 may include the machine readable instructions used in embodiments of the present techniques. In an embodiment, the storage 422 may include a translator 424 and a composer 426. The translator 424 may take as input standardized model descriptions, such as I/O, P/E, and stateful, among others. These inputs may be translated into an automaton-based model, and stored in a universal repository. The composer 426 may, based on a specified goal, select a set of relevant services in the universal repository. The selected services may be composed into a set of composite services. The consumer of the services may select preferred services from the composite set.

Figure 5:
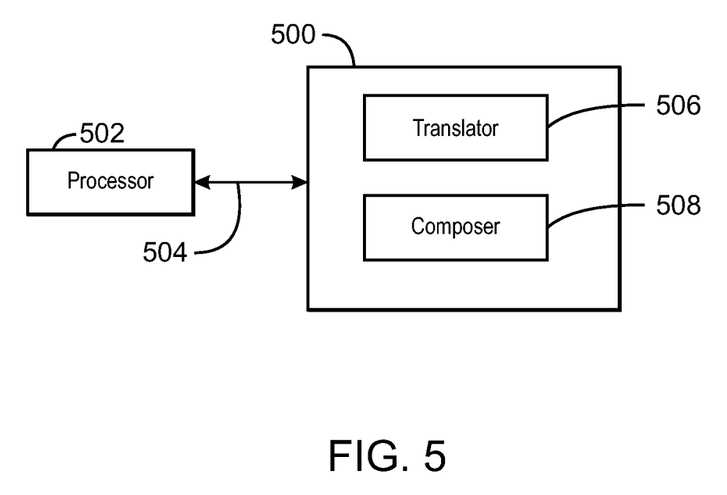
FIG. 5 is a block diagram showing a non-transitory, computer-readable medium that stores code for generating a set of composite services in accordance with an embodiment.

FIG. 5 is a block diagram showing a non-transitory, computer-readable medium that stores code for generating a set of composite services in accordance with an embodiment. The non-transitory, computer-readable medium is generally referred to by the reference number 500.

The non-transitory, computer-readable medium 500 may correspond to any typical storage device that stores computer-implemented instructions, such as programming code or the like. For example, the storage device may include a hard disk drive, a magnetic disk drive, e.g., to read from or write to a removable magnetic disk, or an optical disk drive, e.g., for reading a CD-ROM disk or to read from or write to other optical media. Further, other types of media that are readable by a computer system and that are suitable to the desired end purpose may be used, such as magnetic cassettes, flash memory cards, digital video disks, Bernoulli cartridges, and the like.

The storage device may be connected to a system bus by a storage device interface, such as a hard disk drive interface, a magnetic disk drive interface, or an optical drive interface. For example, the storage device may be the storage 422 discussed with respect to FIG. 4.

When read and executed by a processor 502 via a communication path 504, the instructions stored on the non-transitory, computer-readable medium 500 are adapted to cause the processor 502 to generate a set of composite services according to an example embodiment, as described herein. The non-transitory, computer-readable medium 500 may include a translator 506, and a composer 508.

The translator 506 may translate a standardized service description of a service to an automaton-based description.

The standardized service description may be one of an I/O model description, a P/E model description, and a stateful model description. The composer 508 may generate the set of composite services based on the automaton-based description and a specified goal. The specified goal may describe an initial state and a goal state for the service. The set of composite services may change the initial state to the goal state.

What is claimed is:

1. A method of generating a set of composite services, comprising:
   receiving standardized service descriptions of a set of component services from one or more service providers;
   translating the standardized descriptions of component services to automaton-based descriptions;
   receiving a specified goal associated with the set of component services; and
   generating the set of composite services based on the automaton-based descriptions and the specified goal, wherein each composite service in the set of composite services accomplishes the specified goal.

2. The method recited in claim 1, wherein the standardized service description comprises:
   an input-output (I/O) model description;
   a precondition-effect (P/E) model description; and
   a stateful model description.

3. The method recited in claim 1, comprising generating the standardized service description by adding a syntax to a reference document describing the service.

4. The method recited in claim 1, wherein the specified goal describes an initial state, and a goal state for the service, and wherein the set of composite services achieves the goal state from the initial state.

5. The method recited in claim 1, wherein each of the set of composite services comprises an automaton.

6. The method recited in claim 5, wherein:
   the automaton comprises a plurality of alternative paths to a composition goal from an initial state.

7. The method recited in claim 5, comprising selecting one or more composite services from the set of composite services based on one of:
   non-functional criteria;
   a cost of performing the selected composite services;
   a response time of the selected composite services; and
   combinations thereof.

8. A computer system for generating a set of composite services, comprising:
   an event processing pipeline, comprising:
   a memory storing instructions;
   a processor configured to execute the instructions to:
   translate a standardized service description of a service to an automaton-based description; and
   generate the set of composite services based on the automaton-based description and a specified goal.

9. The computer system recited in claim 8, wherein the standardized service description comprises:
   an input-output (I/O) model description;
   a precondition-effect (P/E) model description; and
   a stateful model description.

10. The computer system recited in claim 8, wherein the processor is configured to execute the instructions to generate the standardized service description by executing instructions to add a syntax to a reference document describing the service.

11. The computer system recited in claim 8, wherein the specified goal describes an initial state, and a goal state for the service, and the set of composite services achieves the goal state from the initial state.

12. The computer system recited in claim 8, wherein each of the set of composite services comprises an automaton.

13. The computer system recited in claim 12, wherein the automaton comprises a plurality of alternative paths to a composition goal from an initial state.

14. The computer system recited in claim 8, wherein the processor is configured to select one or more composite services from the set of composite services based on one of:
   non-functional criteria;
   a cost of performing the selected composite services;
   a response time of the selected composite services; and
   combinations thereof.

15. The computer system recited in claim 8, wherein translate, as an action, includes the ability to:
   represent an availability of input and output data as an automaton state;
   represent a value of state literals as an automaton state; and
   represent a valid operation between states as a transition between automaton states.

16. A non-transitory, computer-readable medium comprising machine-readable instructions executable by a processor to:
   translate a standardized service description of a service to an automaton-based description, wherein the standardized service description comprises:
   an input-output (I/O) model description;
   a precondition-effect (P/E) model description; and
   a stateful model description; and
   generate, using a parallel operator, a set of composite services based on the automaton-based description and a specified goal describing an initial state and a goal state for the service, wherein the set of composite services changes the initial state to the goal state.

17. The non-transitory, computer-readable medium recited in claim 16, wherein each of the set of composite services comprises an automaton, wherein the automaton comprises a plurality of alternative paths to a composition goal from an initial state.

18. The non-transitory, computer-readable medium recited in claim 16, comprising machine-readable instructions executable by a processor to select one or more composite services from the set of composite services.

19. The non-transitory, computer-readable medium recited in claim 18, wherein the machine-readable instructions executable by the processor to select the one or more composite services, based on one of:
   non-functional criteria;
   a cost of performing the selected composite services;
   a response time of the selected composite services; and
   combinations thereof.

20. The non-transitory, computer-readable medium of claim 16, wherein translating includes the ability to:
   represent an availability of input and output data as an automaton state;
   represent a value of state literals as an automaton state; and
   represent a valid operation between states as a transition between automaton states.

* * * * *